Nov. 14, 1950     F. QUACKENBUSH     2,530,266
SECONDARY WINDSHIELD FOR CONVERTIBLE AUTOMOBILES
Filed July 29, 1948     2 Sheets-Sheet 1
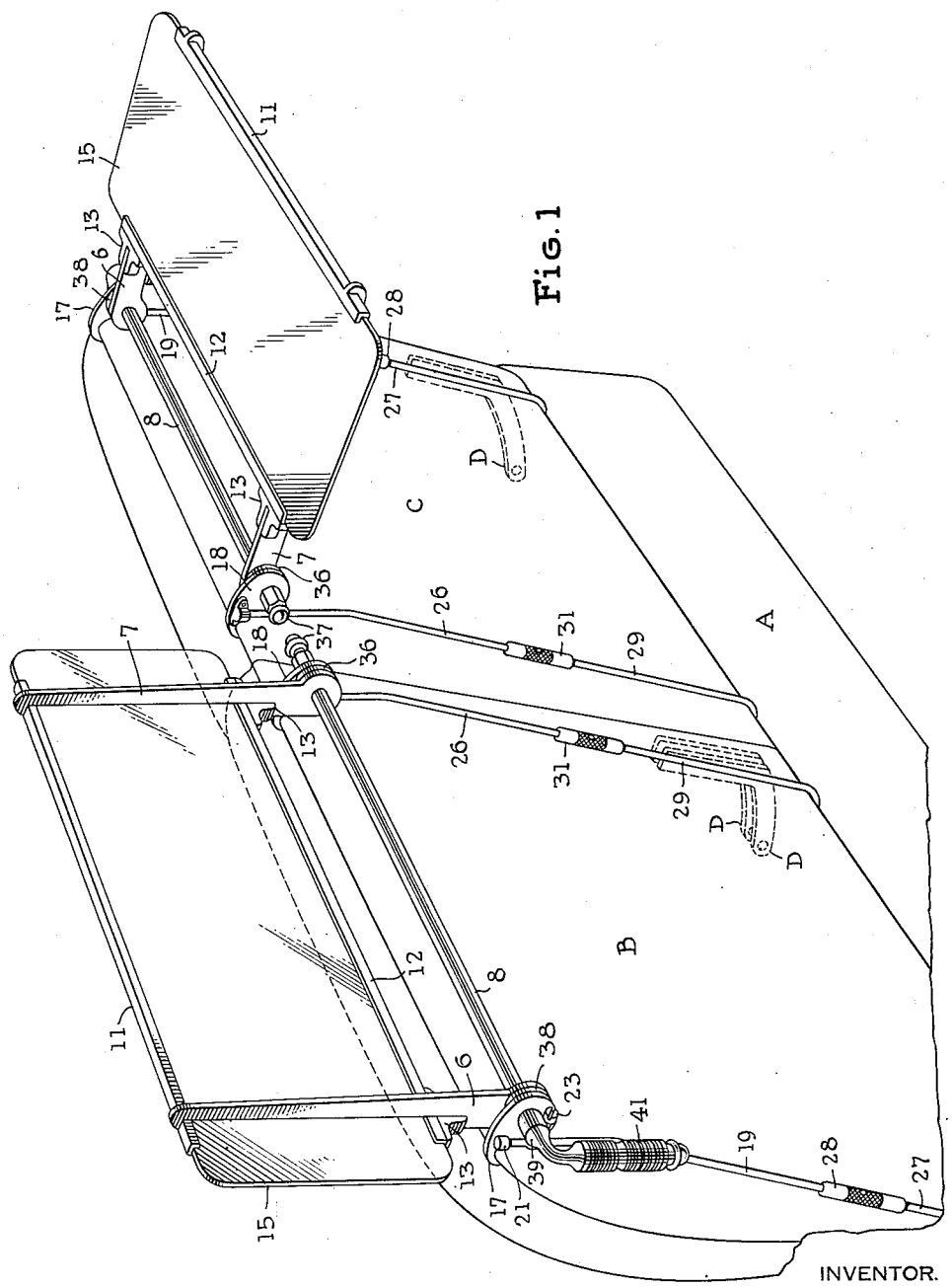
INVENTOR.
Franks Quackenbush
BY
ATTORNEYS.

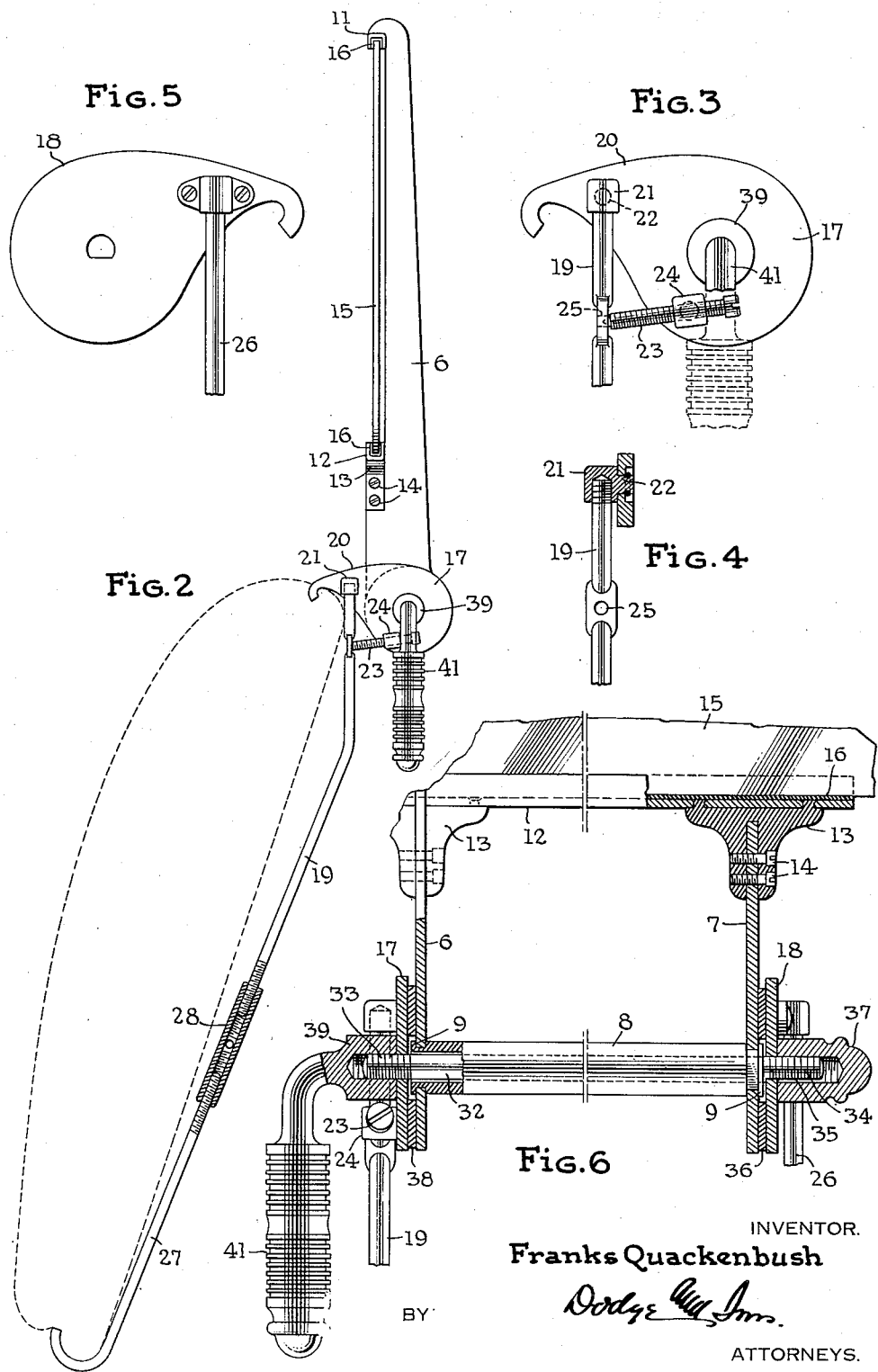

Patented Nov. 14, 1950

2,530,266

UNITED STATES PATENT OFFICE 2,530,266

SECONDARY WINDSHIELD FOR CONVERTIBLE AUTOMOBILES

Franks Quackenbush, Herkimer, N. Y.

Application July 29, 1948, Serial No. 41,374

2 Claims. (Cl. 296—85)

1

This invention relates to windshields adapted to protect occupants of the rear seat of a conventional "convertible" automobile. Despite a general resemblance to the tonneau windshields used on touring cars, the application of windshields to convertible bodies involves a number of special considerations not encountered in a touring car.

In the first place, the majority of these convertible bodies are of the two-door club coupé type, in which the backs of the front seats are separate and are individually hinged to a base frame. This imposes limitations on the form of the windshield and the way in which it is mounted. So far as applicant is advised no attempt to solve this problem has been made.

In a touring car, the tonneau windshield may be needed at any time in the year, and so was customarily permanently mounted. In a convertible body the windshield would not be needed when the top is up, as commonly it is continuously through the winter months. Hence, a detachable mounting is desirable, and this poses another problem because of variations in the form of seat backs and the commercial desirability of a universally adaptable mounting.

The invention affords two windshield sections, each releasably mounted on the back of a corresponding one of the front seats. Thus each windshield is individually adjustable and may be set at will to an active position at any preferred angle, to an inactive position against the back of the front seat and to a horizontal position in which it may be used as a shelf. If desired the transparent panels may be manufactured in different lengths to suit the dimensions of particular bodies, for the frame structure is contrived to receive panels of any length (within the limits required for the stated purpose).

The supporting brackets are adjustable to permit horizontal alinement of the hinge rods, a feature important from the standpoint of appearance, and necessary to prevent interference when the two windshields are closely spaced.

An embodiment of the invention which has demonstrated marked convenience in actual use will now be described by reference to the accompanying drawings in which:

Fig. 1 is a perspective view of two windshield units each mounted on a corresponding seat back.

Fig. 2 is an elevation of one windshield unit shown mounted and in active position. The view is an elevation of the outer (left hand) end of the left hand unit of Fig. 1.

2

Fig. 3 is a view (drawn on a larger scale) of the bracket unit (including part of the turnbuckle rod) used at the end adjacent the side of the car body, in this case the left hand bracket of the left hand windshield. The right hand bracket of the right hand windshield is a counterpart.

Fig. 4 is a detail, partly in section showing the hinge connection between the bracket and turnbuckle rod of Fig. 3.

Fig. 5 is a view of the inner or right hand bracket of the left hand windshield unit of Fig. 1.

Fig. 6 is a view part in section and part in elevation showing details of the panel frame and the connected hinge. The middle portion is broken away to reduce the width of the view.

In Fig. 1 the base of the front seat is indicated at A, the back of the left hand front seat at B, and that of the right hand front seat at C. The backs B and C are hinged to base A to swing forward. The hinge brackets are indicated in dotted lines at D.

Each swinging windshield frame comprises two parallel arms 6 and 7 rigidly fixed to opposite ends of a tube 8. Connection of the arms to the tube can be made in any preferred way. The construction actually used is indicated in Fig. 6. The ends of the tube are machined to fit square holes in the arms 6 and 7 and project through and beyond the arms, the projecting ends being peened over as indicated at 9.

Each end of each arm is connected to a top channel bar 11. A bottom channel bar 12 has riveted to it two lugs 13. These are slotted to embrace a portion of the arm 6 or 7 as the case may be (see Fig. 6) and are fastened by screws 14. The transparent panel 15, which may be of any suitable material, such as laminated glass or plastic is seated in the channel bars 11 and 12 on resilient channel gaskets 16 as best shown in Fig. 2. Removal of screws 14 frees lugs 13 permitting removal and replacemet of transparent panels.

Each windshield frame is hinged between two brackets which hook over the top edge of the rigid back of the upholstered seat back. The "outer" bracket 17 used adjacent the side of the car is shown as of an adjustable type while the "inner" bracket 18 used adjacent the middle of the car is not adjustable. As a practical matter either bracket of a pair could be made adjustable and the other not. Except for expense there is no reason why both should not be adjustable. At least one of a pair should be adjustable to permit respective hinge axes to be set to lie in a horizontal plane. This arises from the fact that many hinged, individual seat backs are not symmetrical with respect to their vertical medial lines. A similar condition arises where the windshields are to be applied to a single (undivided) full width seat back, such as are used in four door bodies.

The adjustable brackets 17 comprise a disk-like body and a hooked arm 20 as clearly shown in Fig. 3. A rod 19 is connected to the hooked arm 20 by means of a lug 21 swiveled at 22 in the bracket 17 (see Fig. 4). A thrust screw 23 threaded in a lug 24 on the bracket engages a socket 25 in rod 19 and serves as means to adjust the angular relation of the hooked arm to the rod 19.

The bracket 18 is generally similar. However, in the illustrated embodiment the rod 26, which is the analog of rod 19 is rigidly attached to the bracket 18, so that there is no swivel connection such as 22 and no thrust screw such as 23, (see Fig. 5).

The rod 19 forms part of a turnbuckle comprising a hooked rod extension 27 connected to the rod 19 by a turnbuckle sleeve 28 with reverse thread connections to the proximate ends of the two rods. The lower hooked end of extension rod 27 engages the lower margin of the rigid back of the seat.

Rod 26 has a similar hooked extension 29 connected by a turnbuckle sleeve 31.

Refer now to Figs. 2 and 6. Tube 8 is swiveled on a rod 32 whose ends are supported in brackets 17 and 18, respectively. Both ends of rod 32 are threaded as indicated at 33 and 34. The threaded end 34 has a flat (see 35 in Fig. 6) which engages a D-shaped hole in bracket 18 and prevents the rod from turning in this bracket. This opening is shown in Fig. 5. A friction washer 36 is interposed between arm 7 and bracket 18 and an acorn nut 37 is screwed onto the threaded end of rod 32.

A second friction washer 38 is interposed between arm 6 and adjustable bracket 17 and a clamp nut 39 is screwed onto the threads 33 and can be turned by the radial handle 41 to stress rod 32 in tension and develop clamping pressure on both friction washers 36 and 38.

The right hand windshield, shown in Fig. 1 is a mirror duplicate of the left hand one above described. The threads on the outer end of the rod analogous to 32 (i. e. the threads such as 33) are left hand, so that the handle analogous to 41 will be turned in the same direction as handle 41 (rearward and down) to lock the hinge.

The windshield units are mounted on respective seat backs and lined up by adjusting screws 23 and sleeves 28 and 31. The axes of rods 32 are not necessarily strictly alined, but they will approximate such alinement and should be in the same horizontal plane. After the units are mounted either may be freed to swing in the horizontal hinge by swinging the corresponding handle 41 upward. The clamping action can be adjusted by turning the nut 37, so that a half-turn of handle 41 will free and lock the hinge.

Since each windshield is supported exclusively on one seat back, each seat back may be swung forward, carrying the windshield unit with it, and this may be done regardless of the position in which the windshield is set.

Because of the use of two units and because of the adjustable mounting these windshield units can be attached to various specifically different seat backs, whether they be divided and hinged, or constructed in one piece and fixed.

What is claimed is:

1. The combination of a seat structure including a back characterized by rigid top and bottom marginal elements exposed at the rear of the said back; a pair of spaced releasable clamps overlying the rear face of the seat back and engaging said marginal elements; a windshield hinged near its lower margin on a substantially horizontal axis to the clamps of said pair and adjusting means included in at least one of said clamps and operable to shift the clamp in a generally vertical direction to adjust the inclination of said hinge axis.

2. The combination of a seat structure including a base, and a seat back comprising two separate back sections individually hinged to the base, and each characterized by rigid top and bottom marginal elements which are exposed at the rear of each back section; two pairs of spaced releasable clamps the clamps of respective pairs overlying corresponding back sections and engaging the marginal elements thereof; individual windshield sections, one for each seat back section, each hinged near its lower margin on a substantially horizontal axis to the clamps of a corresponding pair; and adjusting means included in at least one clamp of each pair and operable to adjust the inclination of said hinge axis.

FRANKS QUACKENBUSH.

REFERENCES CITED

The following references are of record in the file of this patent:

UNITED STATES PATENTS

| Number | Name | Date |
| --- | --- | --- |
| 711,622 | Fergusson | Oct. 21, 1902 |
| 1,787,097 | Wendel | Dec. 30, 1930 |
| 2,442,821 | Menrath | June 8, 1948 |

FOREIGN PATENTS

| Number | Country | Date |
| --- | --- | --- |
| 26,660 | France | Oct. 30, 1923 |